United States Patent [19]

Clark, Jr.

[11] 4,077,672
[45] Mar. 7, 1978

[54] METHOD OF MAKING A SPONGE MOP PART

[75] Inventor: Frank T. Clark, Jr., Erie, Pa.

[73] Assignee: Tantera, Inc., Girard, Pa.

[21] Appl. No.: 727,367

[22] Filed: Sep. 27, 1976

[51] Int. Cl.² ............................................. A47L 13/46
[52] U.S. Cl. ................................. 300/21; 15/244 C
[58] Field of Search .......... 300/21; 15/244 R, 244 C; 425/129 R

[56] References Cited

U.S. PATENT DOCUMENTS

| | | | |
|---|---|---|---|
| 2,313,787 | 3/1943 | Vaughn | 300/21 |
| 2,666,954 | 1/1954 | Potter | 300/21 |
| 2,877,478 | 3/1959 | Kohlwey et al. | 15/244 R |
| 3,355,844 | 12/1967 | Abler et al. | 15/244 R |
| 3,458,268 | 7/1969 | Wozab et al. | 15/244 R |

Primary Examiner—Granville Y. Custer, Jr.
Attorney, Agent, or Firm—Charles L. Lovercheck

[57] ABSTRACT

A process for making a replaceable part of a sponge mop normally referred to as a refill. The refill is made by enclosing the sponge in a mold and compressing it to close the pores of the sponge on at least one side. A thermoplastic material in the molten state is then injected into the mold against at least one surface of the sponge and allowed to cool. The sponge is then removed from the mold, and water is applied to it to expand it to its original condition.

2 Claims, 4 Drawing Figures

U.S. Patent  March 7, 1978  4,077,672
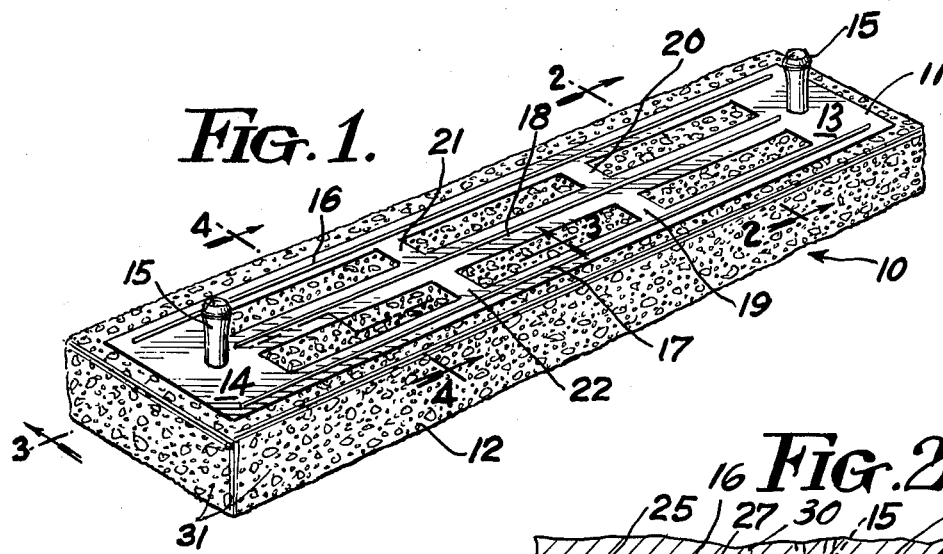

METHOD OF MAKING A SPONGE MOP PART

GENERAL DESCRIPTION OF INVENTION

It is common in the art to mold a thermoplastic mop refill part and to attach a sponge to the mop holder part by means of adhesive or other suitable material. Applicant has discovered that, by compressing the cellulose sponge in the mold, plastic material can be injection molded to at least one side of the sponge in the mold cavity. The cellulose sponge is later removed and expanded to its original condition.

REFERENCE TO PRIOR ART

The idea of attaching a mop holder to a sponge by adhesive is shown in U.S. Pat. Nos. 3,467,979 and 3,287,756. Neither of the patents show the idea of injection molding the plastic materials in contact with the sponge so that the plastic adheres to the sponge.

OBJECTS OF THE INVENTION

It is an object of the invention to provide an improved process for making a sponge mop.

Another object of the invention is to provide an improved sponge mop.

Another object of the invention is to provide a sponge mop that is simple in construction, more economical to manufacture and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is an isometric view of the completed sponge mop refill.

FIG. 2 is a longitudinal cross-sectional view taken on line 2—2 of FIG. 1 of the die for making the sponge refill part with a sponge and plastic back thereon.

FIG. 3 is a longitudinal cross-sectional view taken on line 3—3 of FIG. 1 of the sponge mop refill part after removal from the mold and before expansion of the sponge.

FIG. 4 is a cross-sectional view taken on line 4—4 of FIG. 1 of the sponge mop part after expansion.

DETAILED DESCRIPTION OF THE DRAWINGS

Now, with more particular reference to the drawings, the sponge mop refill part according to the invention is indicated generally at 10 and a plastic sponge back 11 which is injection molded to the sponge 12. The plastic sponge back 11 has enlarged end members 13 and 14 with integral pintles 15 molded to them. End members 13 and 14 have the ribs 16, 17 and 18 extending between them. Transverse members 19, 20, 21 and 22 are molded to the longitudinal members 16, 17 and 18.

The sponge is a piece of sponge formed or cut to the desired size and preferably made of a material having the characteristics of cellulose sponge familiar to those skilled in the art. The sponge is placed in the cavity 24 of the mold and the upper mold part 25 is brought into contact with lower mold part 26. The mold part has recesses 27, 28 and 29 for forming the ribs 16, 17 and 18 of the plastic sponge mop back.

It will be noted that in FIG. 2 the sponge mop is compressed to approximately 1/16 inch thickness from its normal size as shown in FIG. 1 which is approximately 2¼ inch wide, 8½ inch long and 1 inch thick.

The thermoplastic material is then injected into the mold from a suitable heating cylinder through a sprue opening 30 and, when the plastic material injected is solidified, mold parts 25 and 26 may be separated from each other and the part indicated at 10' in FIG. 3 can be removed from the mold. The sponge 12 will have a thickness of approximately 1/16 inch, for example, after removal from the mold. Water will then be applied to the compressed sponge and it will expand to the original thickness as shown in FIG. 4.

Thus, to carry out the method for making the sponge mop part indicated generally at 10, a piece of cellulose sponge material 12 is provided and introduced into a mold part having mold parts 25 and 26. The sponge is then compressed in the mold cavity 24 to approximately 1/16 inch thick, thereby closing substantially all of the pores 31 in the sponge material. The sponge may bulge into the cavities which later receive plastic. Plastic is then introduced through the sprue opening 30 and flows into the mold cavity forming the plastic back support 11.

Since the pores of the sponge mop are substantially compressed, only a little of the plastic material penetrates the sponge and most of it adheres to the outer surface of the sponge.

When the material making up the plastic back 11 has solidified, the mold is opened and the plastic back, and the sponge adherring to it, is removed.

When first removed from the mold, the sponge, being cellulose material, will retain substantially the thickness to which it is compressed in the mold as shown in FIG. 3, i.e., about 1/16 inch thick as compared with the original thickness of approximately 1 inch.

The mop 10, at this point, will have a thin appearance since the sponge is very thin in its compressed condition. However, as soon as water touches the sponge, it immediately expands to its original thickness having the appearance shown in FIG. 1. The sponge mop part may then be attached to a sponge mop assembly part and the pintles inserted into the complimentary-shaped openings in the sponge mop assembly part.

The foregoing specification sets forth the invention in its preferred, practical forms but the structure shown is capable of modification within a range of equivalents without departing from the invention which is to be understood is broadly novel as is commensurate with the appended claims.

I claim:

1. A method of making a sponge mop part comprising,
    providing a sponge made of cellulose material of approximately the size of the mop desired,
    introducing said sponge in its normal condition into a mold cavity having space in which said sponge is received and longitudinally recesses for receiving plastic material for forming ribs on said sponge,
    compressing said sponge in said space by reducing the size of said mold cavity thereby exerting a force and compressing said sponge to approximately one sixteenth of its normal thickness to substantially compress all of its pores, injecting plastic molding material into said recesses cavity against at least one side of said sponge and allowing said plastic to solidify thereby forming a plastic back, removing said sponge and plastic back from said mold, and moistening said sponge with water thereby expanding said sponge to its original size.

2. The method recited in claim 1 wherein said mop part is approximately 2 inches wide, 8 inches long and 1 inch thick.

* * * * *